Aug. 20, 1929.   A. J. MORROW   1,725,095
WAREHOUSE TRUCK
Filed April 20, 1927   2 Sheets-Sheet 1
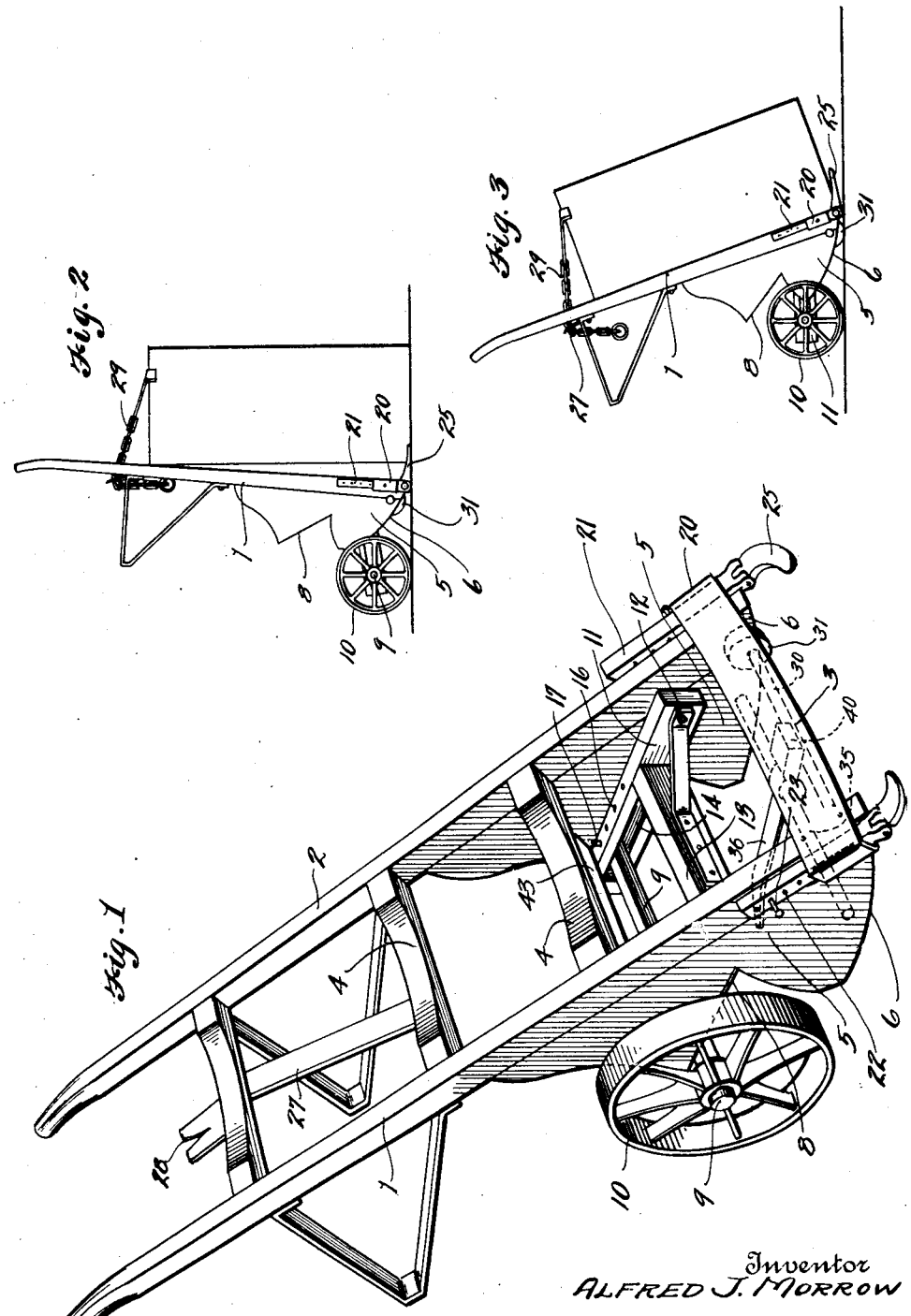
Inventor
ALFRED J. MORROW
By Attorney
Richard J. Cook Aug. 20, 1929.  A. J. MORROW  1,725,095
WAREHOUSE TRUCK
Filed April 20, 1927   2 Sheets-Sheet 2
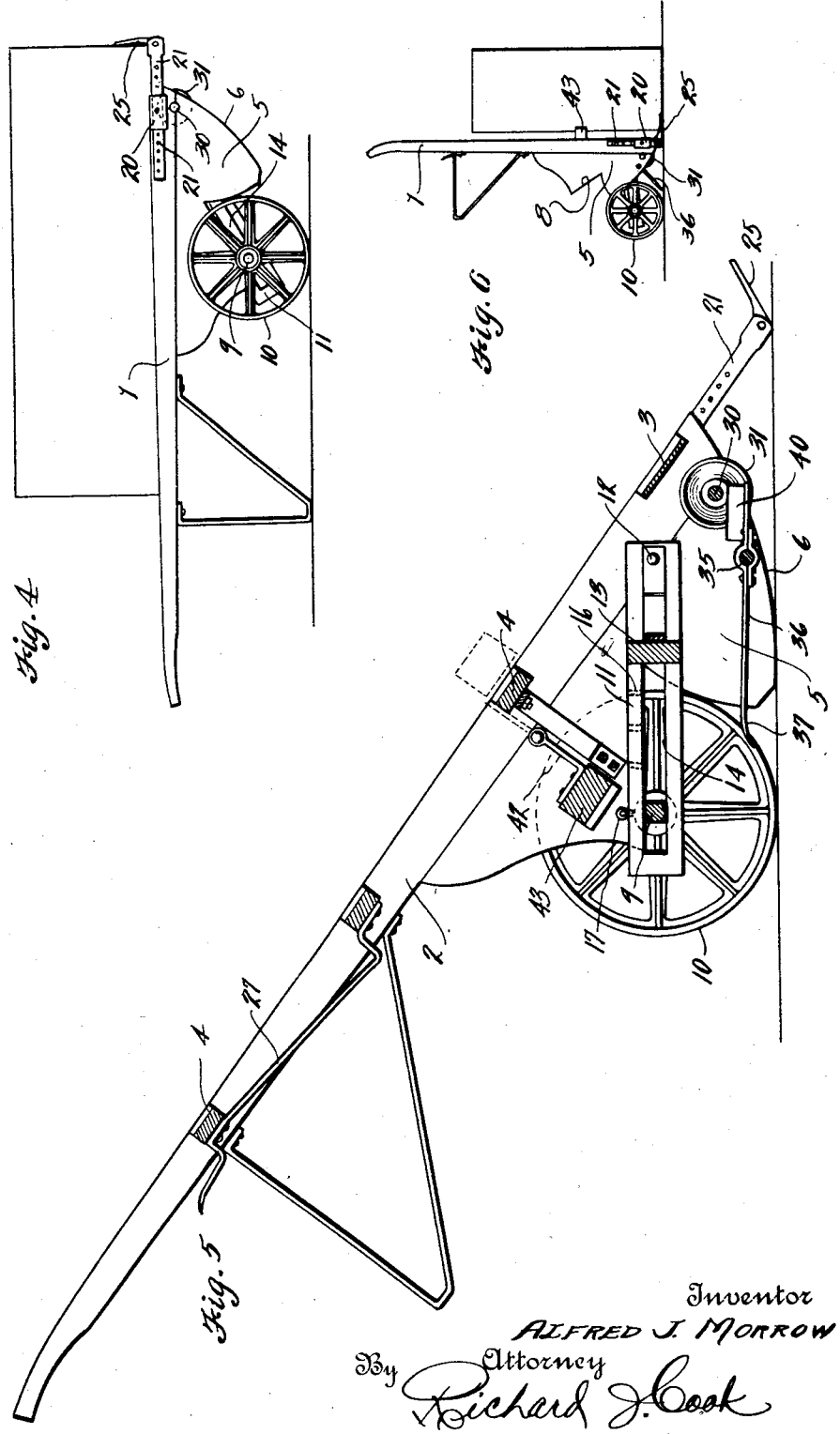
Inventor
ALFRED J. MORROW
By Attorney
Richard J. Cook Patented Aug. 20, 1929.

1,725,095

UNITED STATES PATENT OFFICE.

ALFRED J. MORROW, OF OAKLAND, CALIFORNIA.

WAREHOUSE TRUCK.

Application filed April 20, 1927. Serial No. 185,330.

This invention relates to improvements in warehouse trucks, and more particularly to a new design of truck for use in warehouses, on docks, aboard ships, scows, etc.; particularly designed for the handling of all sizes of rolls of news print paper without damage to package; also for the handling of barrels, boxes, bales and other classes of heavy freight.

The principal object of the invention is to improve upon trucks of the common type now generally in use, by the provision of means whereby an adjustment of the supporting wheels may be effected for balancing loads of different size and character upon the truck, and wherein a rocker construction is embodied upon the frame which permits the easy raising of a load to position for moving and, when unloading is done, permits the load to be lowered without jar or jolt and with little effort on the part of the operator.

Another object of the invention resides in the provision of a set of rollers adjacent the nose of the truck, and in their disposition with respect to the rockers, and which are for the purpose of facilitating the positioning of the truck when loading or unloading is done.

Other objects of the invention reside in the provision of a check bar and a pry block, whereby the removal of the truck nose from beneath a load is facilitated, and the proper packing or placing of an unloaded article may be accomplished.

In accomplishing these and other objects of the invention, I have provided the improved details of construction, the preferred forms of which are illustrated in the accompanying drawings, wherein—

Figure 1 is a perspective view of a truck constructed according to the present invention.

Figure 2 is a side view of the truck positioned preparatory to the loading of a roll of paper, or the like, thereon.

Figure 3 is a similar view, showing the position of the truck after the initial loading movement.

Figure 4 is a side view of the truck with the load thereon in position for transportation.

Figure 5 is a vertical section taken longitudinally through the truck frame.

Figure 6 is a side view of the truck illustrating the use of the pry block for moving the nose of the truck from beneath a load.

Referring more in detail to the several views of the drawings—

1 and 2 designate parallel, spaced handle bars of the truck frame which are connected rigidly at their forward ends by means of a transverse nose plate 3 and, at spaced intervals towards their opposite ends, by cross bars 4. The plate 3, and also the cross bars, may be provided as shown with downwardly curved upper surfaces which facilitate the moving rolls of paper, barrels or other cylindrical objects.

Secured to the under side of the bars 1 and 2, adjacent their forward ends, are rocker heads 5 provided with radially curved surfaces 6 that extend rearwardly and downwardly from the nose of the truck and upon which that end of the truck may be supported when the handle bars are inclined at an angle of about 30 degrees or more with respect to the floor. Rearwardly of the rolling surfaces 6, the rocker heads are cut so as to form bearing surfaces 8 against which a transverse axle 9, having trucking wheels 10 at its ends, may engage to support the truck frame in position for transportation. These bearing surfaces 8 are so formed relative to the rocker portions that, when the handle bars are inclined at about thirty degrees with the floor, they will extend substantially on a horizontal level.

Located between the rocker heads, is a frame structure comprising parallel, opposite side rails 11 which are pivotally fixed at their upward ends, by means of bolts 12, to directly opposite points of the bars 1 and 2. These rails are joined by a cross bar 13 and, at their rearward ends, have longitudinal slots 14 therein through which the axle 9 extends. There are vertical apertures 16 through these ends of the rails and the axle is also provided with apertures adapted to register with corresponding apertures in the rails to receive pins 17 therethrough for retaining the axle at any adjusted position transversely of the frame, closer to or farther from the nose of the truck. This adjustment of the axle is provided in order that it may be moved according to the size or character of the load, and the latter balanced upon the truck to be carried to the best advantage.

The opposite ends of the nose plate 3 extend slightly beyond the handle bars and are bent to form guide-ways 20 wherein extension legs 21 are slidably mounted. Along their outer portions the legs are provided with a series of spaced apart apertures 22 for receiving pins 23, whereby the outward movement of the legs may be limited. At their lower ends, each leg has a foot 25 pivotally mounted thereon, with a limited movement, and which extend forwardly and are curved inwardly as is shown in Figure 1.

A bar 27 is fixed to the two upper cross bars 4 between the handle bars and parallel therewith. This bar has an end notch 28 for receiving the links of a chain 29 therein, whereby attachment of a load to the truck may be made.

Closely adjacent the nose of the truck is a cross shaft 30 (see Figure 5) whereon relatively small rollers 31 adjacent opposite sides of the truck are mounted. These rollers extend just slightly below the rocking surfaces 6 of the rocker heads, so that they only take effect at times when the handle bars are held approximately between 10 and 30 degrees from a vertical position. This disposition of the rollers permits the truck to be more easily positioned adjacent the load to be placed thereon, or to be moved away from an object after it has been unloaded, as will presently be described.

Adjacent the shaft 30, but rearwardly thereof, is a cross shaft 35 whereon a check lever 36 is pivotally mounted and which has a downturned, sharpened rearward end 37 that may be pressed into engagement with the floor when the nose is being used for prying packages into position as will presently be described. A counterpoise 40 is placed on the forward end of the lever whereby it is normally held disengaged from the floor.

Extending transversely between the rocker heads 5, is a pry bar 43 that is pivotally supported from the frame by means of brackets 42 at its opposite ends. This bar may be swung upwardly so that it extends beyond the upper surface of the truck to be used as a fulcrum for drawing the shoes from beneath a load, or it may be moved downwardly within the frame of the truck to nonfunctional position, as it is shown in Figure 5.

Assuming that the truck is so constructed, its operation and use would be as follows:

Since the device is particularly adapted for the handling of rolls of paper, or the like, the loading of such a roll has been illustrated in several views of the drawings. However, it is not limited only to this class of goods. In loading a roll of paper the operator first positions the nose of the truck adjacent the roll and then raises the handle bars so as to bring the rollers 31 in contact with the floor which makes proper positioning easy. Further upward movement of the handles causes the nose of the truck to engage the floor and places the truck in position, as illustrated in Figure 2. By means of the chain 29, the upper end of the roll to be loaded is then secured against the truck frame; the handles are then swung downwardly and during this movement the rollers 31 again engage the floor, so that the lower end of the truck moves slightly forward until the plate 3 seats against the lower end of the roll and legs 21 move outwardly so that the feet 25 have moved beneath the roll; this movement of the feet being possible due to their pivotal mounting and the inclined position of the roll and the raising of its side edges from the floor. Continued downward movement of the handles rolls the load downwardly on the rockers 6 and brings the supporting surfaces 8 of the rocker heads against the axle 9 and the forward end of the truck is then lifted from contact with the floor. By previously adjusting the axle 9 at a desired position and by providing for a desired extension of the legs 21, the load may be balanced upon the truck, so that it may be easily held in position for transporting by the operator.

It will be noted that as the load is raised, its weight is supported on the curved surfaces 6 of the rocker heads 5, and gradually its weight settles onto the axle 9. Also, when the load is lowered during an unloading operation, its weight will be supported on the curved surfaces of the rocker which permits it to be lowered gradually and easily to unloading position; and damage that might be caused by a jolt or jar is eliminated. Since the center of gravity of the load remains substantially perpendicular above the point of contact of the rocker with the floor. the operator has no weight to lift or hold and can handle the load easily and without danger to himself or the load.

After a load has been moved to unloading position and it is desired that it be packed tightly against a wall or between other articles, the operator steps on the checking bar, so that it engages the floor and, by pulling rearwardly on the upper ends of the handle bars, the nose plate is brought into engagement with the load and the latter will be pryed into the desired position. To draw the shoes from beneath a load, the pry block 43 is swung outwardly as shown in Figure 6, and the upper ends of the handles are pushed forwardly causing the nose to be moved rearwardly.

Having thus described my invention, what I claim as new therein and desire to secure by Letters-Patent is:

A truck of the character described comprising a frame structure, spaced apart heads fixed to the forward end of the frame forming radially curved rockers upon which the frame may be rollingly supported while being moved between loading and transporting positions; said heads being formed rearwardly of the rockers with straight bearing surfaces, an axle supporting frame comprising opposite side rails pivotally fixed at their forward ends to the frame and extending rearwardly therealong and having longitudinal slots therein, an axle extended through the slots and adjustable therealong in their longitudinal direction and against which the bearing surfaces of the rockers are adapted to engage when the frame is tilted rearwardly to relieve the weight from the rocker portions, and ground wheels at the ends of said axle.

Signed at Seattle, Washington, this 11th day of April, 1927.

ALFRED J. MORROW.